United States Patent
Boukobza

(10) Patent No.: US 8,272,863 B2
(45) Date of Patent: Sep. 25, 2012

(54) BOTTOM OF A MOULD FOR A MOULD FOR PRODUCING THERMOPLASTIC CONTAINERS, AND MOULDING DEVICE COMPRISING AT LEAST ONE MOULD PROVIDED WITH SUCH A BOTTOM

(75) Inventor: Michel Boukobza, Octeville-sur-Mer (FR)

(73) Assignee: Sidel Participations, Octeville sur Mer (FR)

( * ) Notice: Subject to any disclaimer, the term of this patent is extended or adjusted under 35 U.S.C. 154(b) by 356 days.

(21) Appl. No.: 12/595,416

(22) PCT Filed: Jan. 5, 2009

(86) PCT No.: PCT/FR2009/050004
§ 371 (c)(1),
(2), (4) Date: Oct. 9, 2009

(87) PCT Pub. No.: WO2009/092930
PCT Pub. Date: Jul. 30, 2009

(65) Prior Publication Data
US 2010/0119643 A1    May 13, 2010

(30) Foreign Application Priority Data
Jan. 8, 2008  (FR) ..................... 08 50073

(51) Int. Cl.
*B29C 49/48* (2006.01)
(52) U.S. Cl. ........................... 425/522; 425/470
(58) Field of Classification Search .................. 425/522, 425/470; 220/606; 215/373
See application file for complete search history.

(56) References Cited

U.S. PATENT DOCUMENTS
5,762,981 A * 6/1998 Nitsche .......................... 425/522
(Continued)

FOREIGN PATENT DOCUMENTS
FR      2 897 292 A1    8/2007
(Continued)

OTHER PUBLICATIONS
International Search Report for PCT/FR2009/050004, dated Aug. 24, 2009.

*Primary Examiner* — Robert B Davis
(74) *Attorney, Agent, or Firm* — Sughrue Mion, PLLC

(57) ABSTRACT

The invention relates to a bottom of a mold (13) for a mold for producing containers, especially bottles, by blow molding or blow drawing, said containers having a body and a bottom (14) of a container, comprising a peripheral base (15) in the shape of a crown, which is connected on the inside to a central area (16) forming an arch consisting of a plurality of radiating impressions (17) alternating with a plurality of radiating projections which are distributed in an angular and equidistant manner about a central axis (Y) of the bottom (14) of the container. For the molding of the central area (16) of the bottom (14) of the container, the bottom (13) of the mold comprises: a plurality of radiating projecting branches (19) distributed in an angular and equidistant manner, and extending approximatively radially to the axis (X) of the bottom of the mold; a central core (20) comprising a lateral wall (21) to which the branches (19) are connected; and in-between sections (22) forming cores of angular sectors regularly separating said branches from each other. The bottom (13) of the mold is characterized in that each radiating projecting branch (19) has an upper part (23) in the form of an inclined platform which descends from the center towards the periphery with at least two points (24, 25) of inflection of the curve.

12 Claims, 3 Drawing Sheets

U.S. PATENT DOCUMENTS

| | | |
|---|---|---|
| 6,276,546 B1 | 8/2001 | Davis et al. |
| 8,011,919 B2 * | 9/2011 | Penet et al. .................. 425/522 |
| 2004/0232103 A1 * | 11/2004 | Lisch et al. .................. 215/374 |
| 2006/0131257 A1 * | 6/2006 | Gatewood et al. ............ 215/373 |
| 2007/0231530 A1 * | 10/2007 | Pedmo et al. ................ 428/66.3 |
| 2009/0020682 A1 | 1/2009 | Penet et al. |
| 2009/0130246 A1 | 5/2009 | Tonga et al. |

FOREIGN PATENT DOCUMENTS

| | | |
|---|---|---|
| WO | 2007/016959 A1 | 2/2007 |

* cited by examiner

BOTTOM OF A MOULD FOR A MOULD FOR PRODUCING THERMOPLASTIC CONTAINERS, AND MOULDING DEVICE COMPRISING AT LEAST ONE MOULD PROVIDED WITH SUCH A BOTTOM

CROSS REFERENCE TO RELATED APPLICATIONS

This is a National Stage of International Application No. PCT/FR2009/050004 filed Jan. 5, 2009 claiming priority based on French Application No. 08 50073 filed Jan. 8, 2008.

This invention relates, in general, to the field of production, by blowing or stretch-blowing, containers, in particular bottles, made of a thermoplastic material such as PET (polyethylene terephthalate).

The portion of the containers that is most difficult to produce is the base. It is indeed the base of the container that supports the weight of the column of liquid contained in the container, and, if it has insufficient mechanical strength, loses its shape and the container can no longer rest in a stable manner on a support.

The base is therefore the portion of the container of which the proper forming by the blowing or stretch-blowing operation is most difficult to perform, due to the very fact that the substantially greater thickness of material involves slower stretching and more difficult forming.

The collapse of the central portion of the container base modifies the position and/or the inclination of the walls. The container no longer rests stably on a planar support.

To improve its mechanical strength, the base normally has a complex, even very complex, shape, with numerous recessed and projecting reliefs of which the proper forming results in the desired mechanical strength.

At any place on the base, it is necessary for the mechanical strength to be sufficient in order to prevent the collapse of the base under the weight of the liquid and the internal pressure (this type of container is often intended to contain carbonated liquids).

In addition, the complex shape of the bases requires great control of the blowing conditions, and in particular the blowing pressure, in order to be capable of properly forming container bases.

The proper deformation of the material in the region of the base has until now been achieved by implementing a blowing operation under high pressure (typically on the order of $40*10^5$ Pa), which enabled this proper deformation of the material to be conjugated with the practice of high rates of production of several thousand containers per hour.

However, the production of a blowing fluid (in general air) under such a high pressure is very costly in terms of material and electric energy consumed, and manufacturers wish to economize at this level. In addition, an increase in production rates can no longer be envisaged under the current production conditions.

We should also emphasize the very significant angular travel to which the material must be subjected during deformation resulting in the semispherical shape of the base of the initial preform toward the wall with a reverse orientation (based on an approximately conical surface); according to the locations, the material may be subjected to an angular travel capable of reaching 90° or even more.

This, combined with the notable thickness of the material in this area, can lead to insufficient plating of the material on the wall of the molding cavity and to poor cooling of the material against the mold; this can result in a poorer quality of the base or of certain parts of the base of the container. In addition, this large angular travel of the material requires a certain amount of time.

Manufacturers of thermoplastic material containers are constantly seeking to improve the economical conditions of production while attempting to produce containers requiring less thermoplastic material, under a blowing pressure that is, if possible, substantially lower (which can result in insufficient plating of the material against the mold), and in particular with ever-increasing rates of production (requiring the material during molding to be managed more quickly).

The most difficult portions to blow are the portions of the mold base that are at the greatest distance from the central axis of the mold base.

This difficulty is further accentuated if there are areas in which the blown material constituting the preform is capable of accumulating, preventing said material from flowing freely over the entire mold base.

FIG. 1 shows a diagrammatic view of such a mold base according to the prior art.

The mold base 1 as shown in FIG. 1 is intended for a mold for producing, by blowing or stretch-blowing, containers, in particular bottles, from preforms made of a thermoplastic material, such as PET, in which the containers have a body and a container base including a peripheral seat, in the shape of a crown, internally connected to a central area forming a vault consisting of a plurality of radiating imprints alternating with a plurality of radiating projections, which are angularly distributed equidistantly around said central axis of the container base. The mold base 1 includes, for molding said central area of said container base:

a plurality of radiating projecting branches 2 that are angularly equidistantly distributed, and extending approximately radially to the axis X of the mold base 1;

a central trunk 3 having a lateral wall 4 to which the branches 2 are connected;

intervals 5 forming portions of angular sectors regularly separating said branches 2 from one another.

The mold base 1 is more specifically intended to enable molding of containers of which the filling is performed at high temperature, i.e. with a heated liquid. These containers are commonly called "HR" (Heat Resistant).

However, according to the prior art, each radiating projecting branch 2 has an upper portion 6 in the form of a plate defining two substantially rectilinear sub-portions 7, 8 connected to one another by a concave connection area 9, in which the first sub-portion 7 is substantially rectilinear and connected to the lateral wall 4 of the central trunk 3, while the second sub-portion is substantially inclined with respect to the axis X.

In addition, an angular demarcation 11 is formed in each interval 5 between the lateral wall 4 of the trunk 3 and the base support 10.

Thus, based on the mold base 1 of FIG. 1, the hot amorphous material from the base of the preform opposite the upper end 12 of the trunk 3 is capable of accumulating on the first sub-portion 7 of the projecting branch 2 and spreads and flows only partially so as to supply hot material to the periphery of the mold base and thus enable the seat of the container to be formed. In addition, the angular demarcation 11 of the interval 5 is difficult to achieve by the hot blown material.

It would therefore be particularly beneficial to produce a mold base enabling the spreading of the hot amorphous material from the base of the preform to be facilitated so as to supply the periphery of the mold base and enable a thicker and more solid container seat to be formed. It would also be particularly beneficial to obtain a mold base facilitating the plating of the hot material at any point of the mold base, including at the level of the intervals between the projecting branches.

To solve the problems associated with the prior art, this invention relates, according to a first aspect, to a mold base for a mold for producing, by blowing or stretch-blowing, containers, in particular bottles, from preforms made of a thermoplastic material, such as PET, in which the containers have a body and a container base including a peripheral seat, in the shape of a crown, internally connected to a central area forming a vault consisting of a plurality of radiating imprints alternating with a plurality of radiating projections, which are angularly distributed equidistantly around a central axis of the container base, wherein the mold base includes, for molding said central area of said container base, a plurality of radiating projecting branches that are angularly equidistantly distributed, and extending approximately radially to the axis of the mold base; a central trunk having a lateral wall to which the branches are connected; intervals forming portions of angular sectors regularly separating the branches from one another, wherein the mold base is characterized in that each radiating projecting branch has an upper portion in the form of an inclined plate sloping downwardly from the center toward the periphery with at least two points of inflection of the curvature, owing to which, during the blowing or stretch-blowing, the blown material from the base of the blown preform can flow more easily over the upper portion of the branch, thereby enabling the spreading and downward flowing movement of the amorphous material from the base of the blown preform to be improved.

To enable optimal spreading and downward movement of the blown material from the preform, the upper portion includes a first convex portion followed by a concave portion, then a second convex portion.

To also facilitate the downward movement of the blown material in the intervals between the branches, the branches and the trunk are formed on the same base support, the intervals each extend partially over the lateral wall of the trunk and partially over the base support, and a concave transition area is provided between the lateral wall of the trunk and the base support.

To increase the internal rigidity of the blown container base and to prevent deformation of the smooth planar surface between two immediately adjacent branches, at least one interval has a bar with a convex ridge located angularly equidistantly between two immediately adjacent projecting branches.

According to an advantageous embodiment, the bar extends partially over the lateral wall of the trunk and partially over the base support.

Advantageously, the inclination of the portion of the interval formed on the base support is between 0 and 30°, and preferably between 10 and 15°.

Advantageously, the angular sector defined by each projecting branch is between 10 and 55°, and preferably between 20 and 25°.

Also advantageously, the axial distance between the upper surface of the central trunk and the projecting branch is between 0 and 10 mm, and preferably between 3 and 4 mm.

According to a second aspect, this invention relates to a mold for producing, by blowing or stretch-blowing, containers, in particular bottles, using a thermoplastic material, such as PET, in which the containers have a body and a base including a peripheral seat, in the shape of a crown, internally connected to a central area forming a vault consisting of a plurality of radiating imprints alternating with a plurality of radiating projections, which are angularly distributed equidistantly around said central axis of the container, wherein the molding device comprises at least one mold consisting of at least three portions of which a mold base includes, for the molding of said central area of the base of the containers, a plurality of radiating projecting branches, which are angularly distributed equidistantly, and extending approximately radially with respect to the axis of the mold base; a central trunk has a lateral wall to which said branches are connected; intervals form portions of angular sectors regularly separating said branches from one another; the molding device is characterized in that the base is arranged as described above.

This invention will now be described with an example, provided solely for illustrative purposes and in no way limiting the scope of the invention, and based on the following drawings, in which.

Figure 1:
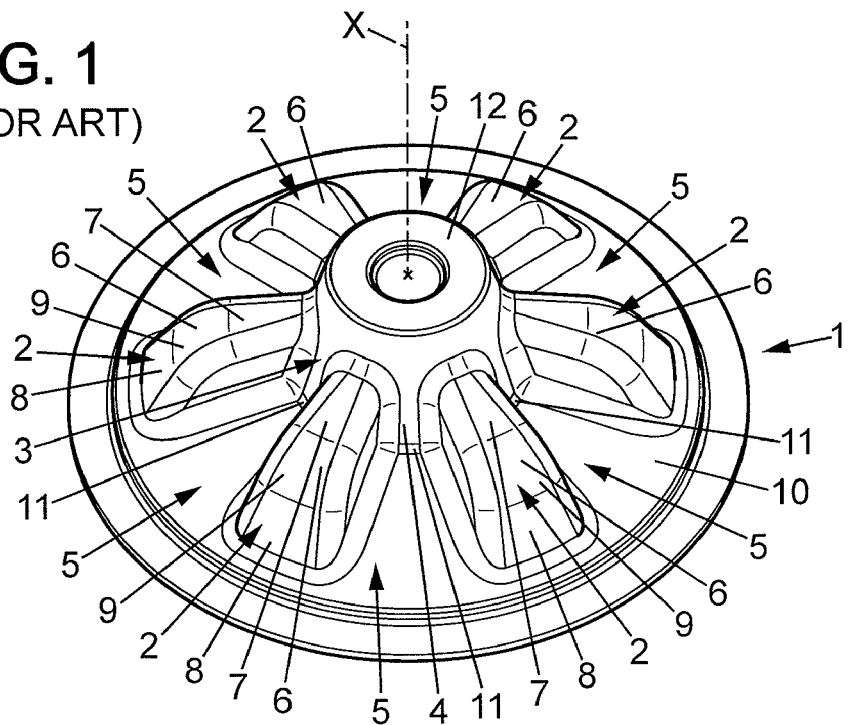
FIG. 1 shows a top perspective view of a mold base according to the prior art.
Figure 2:
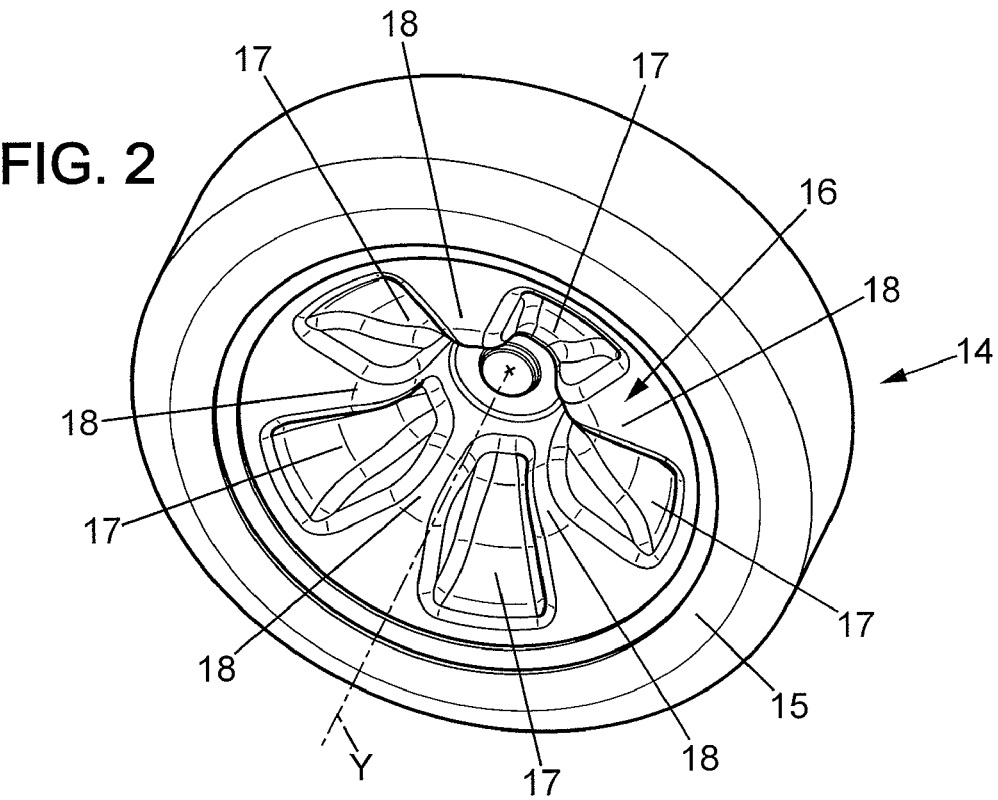
FIG. 2 shows a three-quarter perspective view of a container base obtained from a mold base according to the invention.

The mold base 13 according to the invention, as shown in FIGS. 3 to 6, is more specifically intended for a mold for producing, by blowing or stretch-blowing, containers, in particular bottles, from preforms made of a thermoplastic material, such as PET, in which the containers have a body and a container base 14, as shown in a three-quarter perspective view in FIG. 2, including a peripheral seat 15, in the shape of a crown, internally connected to a central area 16 forming a vault consisting of a plurality of radiating imprints 17 alternating with a plurality of radiating projections 18, which are angularly distributed equidistantly around the central axis Y of the container base 14.

The mold base 13 includes, for molding the central area 16 of the container base 14:
  a plurality of radiating projecting branches 19 that are angularly equidistantly distributed, and extending approximately radially to the axis X of the mold base 13;
  a central trunk 20 having a lateral wall 21 to which said branches 19 are connected;
  intervals 22 forming portions of angular sectors regularly separating the branches 19 from one another.

According to the invention, each radiating projecting branch 19 has an upper portion 23 (i.e. the area or surface projecting most from each branch 19) in the form of an inclined plate sloping downwardly from the center toward the periphery (i.e. in the radial direction going from the central axis X of the mold base 13 to the outside) with at least two points 24, 25 of inflection of the curvature (see FIG. 4, which shows a cross-section view of a projecting branch 19), owing to which, during the blowing or stretch-blowing, the blown material from the base of the blown preform can flow more easily over the upper portion 23 of the radiating projecting branch 19, thereby enabling the spreading and downward flowing movement of the amorphous material from the base of the preform to be improved. It is understood in the description that "point of inflection of the curvature" refers to a point at which the curvature becomes concave, when it had been convex, and the converse, i.e. a point at which the curvature becomes convex, when it had been concave.

Figure 4:
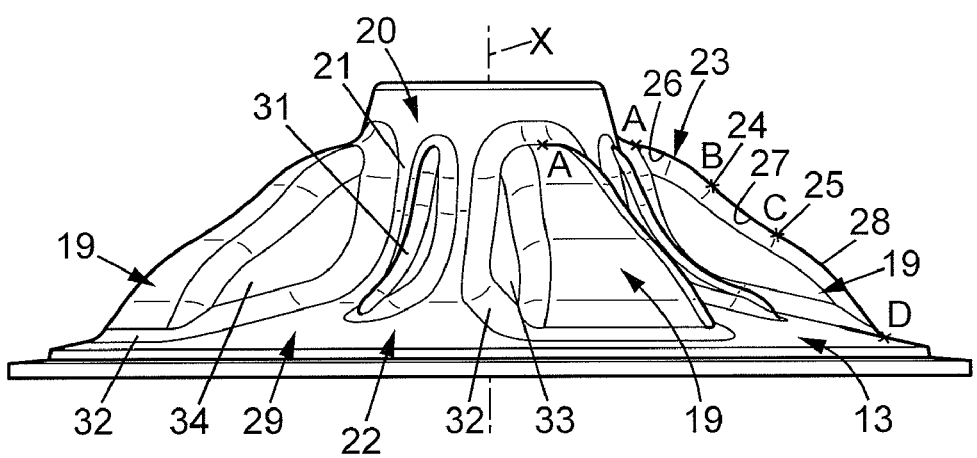
FIG. 4 shows a cross-section view of a projecting branch radiating from the mold base.
Figure 5:
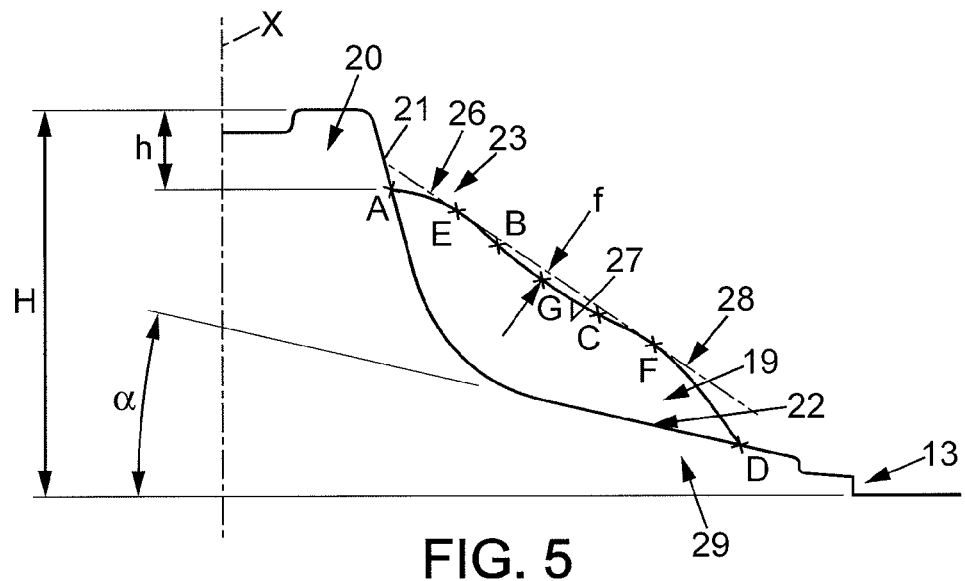
FIG. 5 shows a partial axial cross-section view of a mold base according to the invention.

More specifically, according to the preferred embodiment of the invention, the upper portion 23 of each branch 19 includes a first convex portion 26 followed by a concave portion 27, then a second convex portion 28 (see FIGS. 4 and 5). More specifically, and as clearly shown in FIG. 4, each projecting branch 19 has a first convex portion 26 corresponding to the cross-section going from point A to point B, in which point B corresponds to the first point of inflection 24 of the curvature of the upper portion 23 of the projecting branch 19. The concave portion 27 is defined, according to a cross-section, between point B and point C, in which point C corresponds to a second point 25 of inflection of the curvature of the upper portion 23 of the projecting branch 19. The second convex portion 28 is then defined, according to a cross-section view, between point C and a point D corresponding to the point at which the projecting branch 19 rejoins the base support 29.

The branches 19 and the trunk 20 are formed on the same base support 29. It should be noted that, according to the embodiment of the invention shown, each upper portion 23 of the branches 19 has only two points of inflection of the curvature with a concave portion 27 surrounded on either side by two convex portions 26, 28. It is nevertheless possible to have more than two points of inflection of the curvature, so as to facilitate and improve the flow of the amorphous material blown from the base of the preform onto the upper portion 23 of the projecting branches 19.

In addition, the intervals 22 forming portions of angular sectors each extend partially over the lateral wall 21 of the trunk 20 and partially over the base support 29, a concave transition (or connection) area 30 being provided between the lateral wall 21 of the trunk 20 and the base support 29 (see FIG. 3), so as to thus facilitate the flow of thermoplastic material blown in this interval 22, and so as not to have an angular demarcation between the lateral wall 21 of the trunk 20 and the base support 29, which could block the flow of material and which is also difficult to plate perfectly with the blown thermoplastic material.

To improve the rigidity of the vault formed by the mold base according to the invention and prevent deformation of the smooth planar surface between two immediately adjacent branches 19 as shown in FIG. 4, at least one interval 22 has a bar 31 with a convex ridge located angularly equidistantly between two immediately adjacent projecting branches 19, in which the bar 31 extends partially over the lateral wall 21 of the trunk 20 and partially over the base support 29. Preferably, the bars 31 with a convex ridge are provided for a mold base with four projecting branches 19 and/or enabling high-capacity containers to be blown/molded (i.e. with a capacity greater than or equal to 0.5 L).

By way of example, and as shown more clearly in FIG. 5, the angle a of inclination of the portion of the interval 22 formed on the base support 29, namely the angle of inclination extending between a plane transverse to the axis X and a plane defined by the portion of the interval 22 formed on the base support 29, is between 0 and 30°, and preferably between 10 and 15°.

Figure 6:
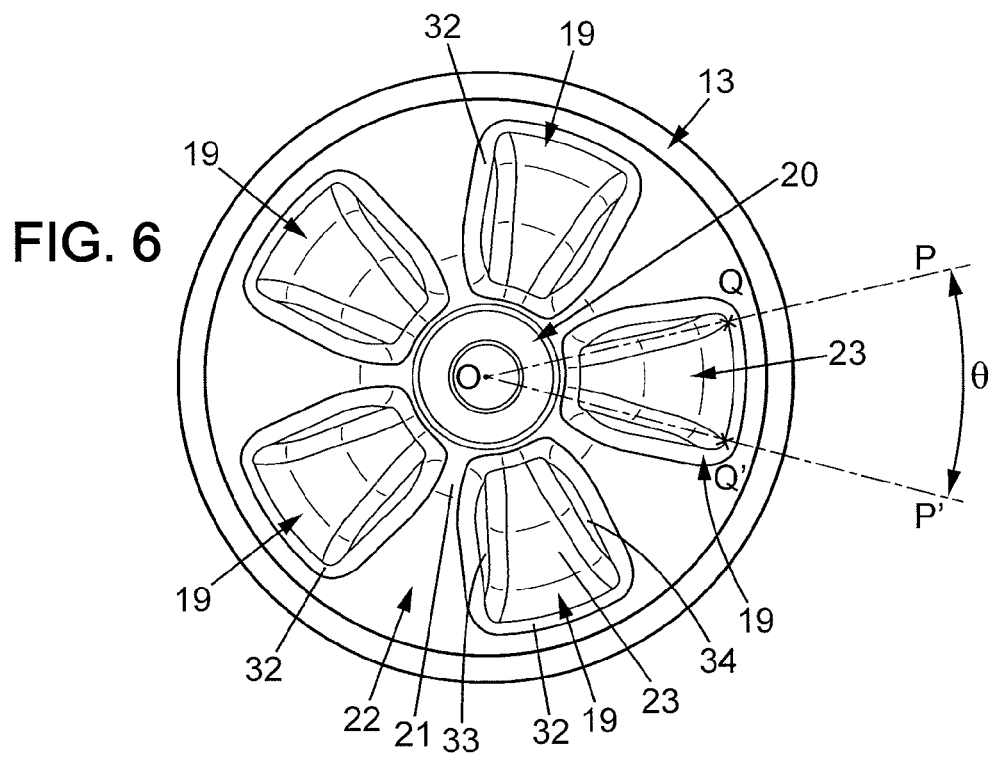
FIG. 6 shows a top perspective view of an embodiment of a mold base according to the invention.

For a mold base 13 with five branches 19 as shown in FIG. 6, the angular sector θ defined by each projecting branch 19 is between 10 and 55°, and preferably between 20 and 25°. It is understood that by angular sector θ of a projecting branch 19, we mean the angle of center O (O being the central point of the mold base 13 corresponding to the point of passage of the axis X) formed in a plane transverse to the axis X and defined by two planes P and P' passing through the axis X and the lateral end points Q, Q' of the upper portion 23 of the projecting branch 19, in which points Q and Q' are lateral points of the upper portion 23 located substantially in the same plane transverse to the axis X with maximal spacing with respect to one another.

The axial distance h between the upper surface of the central trunk 20 and the projecting branch 19 is between 0 and 10 mm, and preferably between 3 and 4 mm. In other words, the distance h corresponds to the distance between a plane transverse to the axis X passing through the highest surface of the trunk 20 and another plane transverse to the axis X passing through point A, i.e. the highest point of the upper portion 23 of the projecting branch 19. The height H, as shown in FIG. 5 and corresponding to the total maximum height of the mold base 13, is variable according to the dimensional characteristics of the container to be molded.

In addition, when considering the line passing through vertices E and F according to the axial cross-section of the branch 19 as shown in FIG. 5, wherein point E corresponds to the vertex of the first concave portion 26 and point F corresponds to the vertex of the second convex portion 28, if the greatest distance between the line (EF) and the vertex G of the concave portion 27 measured according to a line perpendicular to the line (EF) is called f, then the distance f is between 0 and 6 mm, and preferably between 0.2 and 2 mm.

In addition, it should be noted that the radius of curvature of the first convex portion 26 is between 0.3 and 2 times the radius of curvature of the second convex portion 28, and preferably between 0.5 and 1 time this radius of curvature of the second convex portion 28.

Moreover, it should be noted that, for each projecting branch 19, there is an area 32 for connection between its upper portion 23, its lateral portions 33, 34 and the remainder of the mold base 13. More specifically, this connection area 32 extends, on one side, between the lateral wall 21 of the central trunk 20 and the base support 29, and on another side, the lateral portions 33, 34 and the upper portion 23 of the branch 19, with points A, Q and Q' being located at the level of the junction between the upper portion 23 of the branch 19 and this connection area 32.

Figure 3:
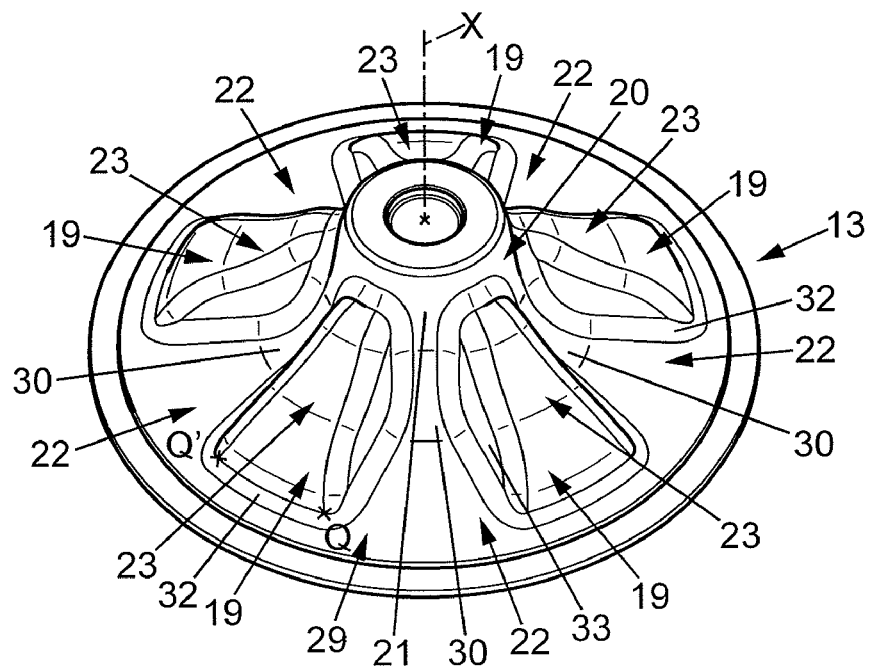
FIG. 3 shows a three-quarter perspective view of a mold base according to the invention.

It should be noted that the mold base 13 according to the invention can comprise four, five (as shown in FIG. 3) or even six projecting radiating branches 19. In general, the mold base 13 comprises a number of projecting branches 19 suitable for the dimensional characteristics (for example the volume) of the blown container, as well as the weight thereof. Preferably, a mold base 13 with four branches 19 is more specifically intended for mold-blowing a square container, in which each branch 19 of the mold base 13 is directed toward an angular corner of the blown square container.

According to another aspect, this invention also relates to a molding device for producing, by blowing or stretch-blowing, containers, in which the molding device comprises at least one mold consisting of at least three portions including a mold base arranged as described above.

The invention claimed is:

1. A mold base for a mold for producing, by blowing or stretch-blowing, containers, from preforms made of a thermoplastic material, in which said containers have a body and a container base including a peripheral seat, in the shape of a crown, internally connected to a central area forming a vault consisting of a plurality of radiating imprints alternating with a plurality of radiating projections, which are angularly distributed equidistantly around a central axis of said container base, wherein said mold base includes, for molding said central area of said container base, a plurality of radiating projecting branches that are angularly equidistantly distributed, and extending substantially radially to the axis of the mold base;

a central trunk having a lateral wall to which said branches are connected;

intervals forming portions of angular sectors regularly separating said branches from one another, wherein each said radiating projecting branch has an upper portion in the form of an inclined plate sloping downwardly from the center toward the periphery with at least two points of inflection of the curvature, owing to which, during the blowing or stretch-blowing, the blown material from the base of the blown preform can flow more easily over said upper portion of said branch, thereby enabling spreading and downward flowing movement of the amorphous material from the base of the blown preform to be improved.

2. The mold base according to claim 1, wherein said upper portion includes a first convex portion followed by a concave portion then a second convex portion.

3. The mold base according to claim 2, wherein said branches and said trunk are formed on a same base support, and in that said intervals each extend partially over said lateral wall of said trunk and partially over said base support, and a concave transition area is provided between said lateral wall of said trunk and said base support.

4. A mold base according to claim 1, wherein at least one interval has a bar with a convex ridge located angularly equidistantly between two immediately adjacent projecting branches.

5. The mold base according to claim 3, wherein a bar extends partially over said lateral wall of said trunk and partially over said base support.

6. The mold base according to claim 1 wherein an angular sector defined by each projecting branch is between 10 and 55°.

7. The mold base according to claim 1 wherein an the axial distance between an upper surface of said central trunk and said projecting branch is between 0 and 10 mm.

8. A molding device for producing, by blowing or stretch-blowing, containers, using a thermoplastic material, in which said containers have a body and a base including a peripheral seat, in the shape of a crown, internally connected to a central area forming a vault consisting of a plurality of radiating imprints alternating with a plurality of radiating projections, which are angularly distributed equidistantly around a central axis of the container, wherein the molding device comprises at least one mold consisting of at least three portions of which a mold base includes, for the molding of central area of the base of the containers, a plurality of radiating projecting branches, which are angularly distributed equidistantly, and extending radially with respect to an axis of said mold base;

a central trunk has a lateral wall to which said branches are connected;

intervals form portions of angular sectors regularly separating said branches from one another;

and wherein each said radiating projecting branch has an upper portion in the form of an inclined plate sloping downwardly from the center toward the periphery with at least two points of inflection of a curvature, owing to which, during the blowing or stretch-blowing, the blown material from the base of the blown perform can flow more easily over said upper portion of the said branch, thereby enabling the spreading and downward flowing movement of the amorphous material from the base of the blown perform to be improved.

9. The mold base according to claim 7, wherein, said axial distance is between 3 and 4 mm.

10. A mold base for a mold for producing, by blowing or stretch-blowing, containers, from preforms made of a thermoplastic material, in which said containers have a body and a container base including a peripheral seat, in the shape of a crown, internally connected to a central area forming a vault consisting of a plurality of radiating imprints alternating with a plurality of radiating projections, which are angularly distributed equidistantly around a central axis of said container base, wherein said mold base includes, for molding said central area of said container base, a plurality of radiating projecting branches that are angularly equidistantly distributed, and extending substantially radially to the axis of the mold base;

a central trunk having a lateral wall to which said branches are connected;

intervals forming portions of angular sectors regularly separating said branches from one another, wherein each said radiating projecting branch has an upper portion in the form of an inclined plate sloping downwardly from the center toward the center periphery with at least two points of inflection of a curvature, owing to which, during the blowing or stretch-blowing, the blown material from the base of the blown preform can flow more easily over said upper portion of said branch, thereby enabling the spreading and downward flowing movement of the amorphous material from the base of the blown preform to be improved, wherein said upper portion includes a first convex portion followed by a concave portion, then a second convex portion, wherein said branches and said trunk are formed on a same base support, and in that said intervals each extend partially over said lateral wall of said trunk and partially over said base support, and a concave transition area is provided between said lateral wall of said trunk and said base support and wherein an inclination of a portion of said interval formed on said base support is between 0 and 30°.

11. The mold base according to claim 10, wherein said inclination is between 10 and 15°.

12. The mold base according to claim 6 wherein an angular sector defined by each projecting branch is between 20 and 25°.

* * * * *